Figure 1:
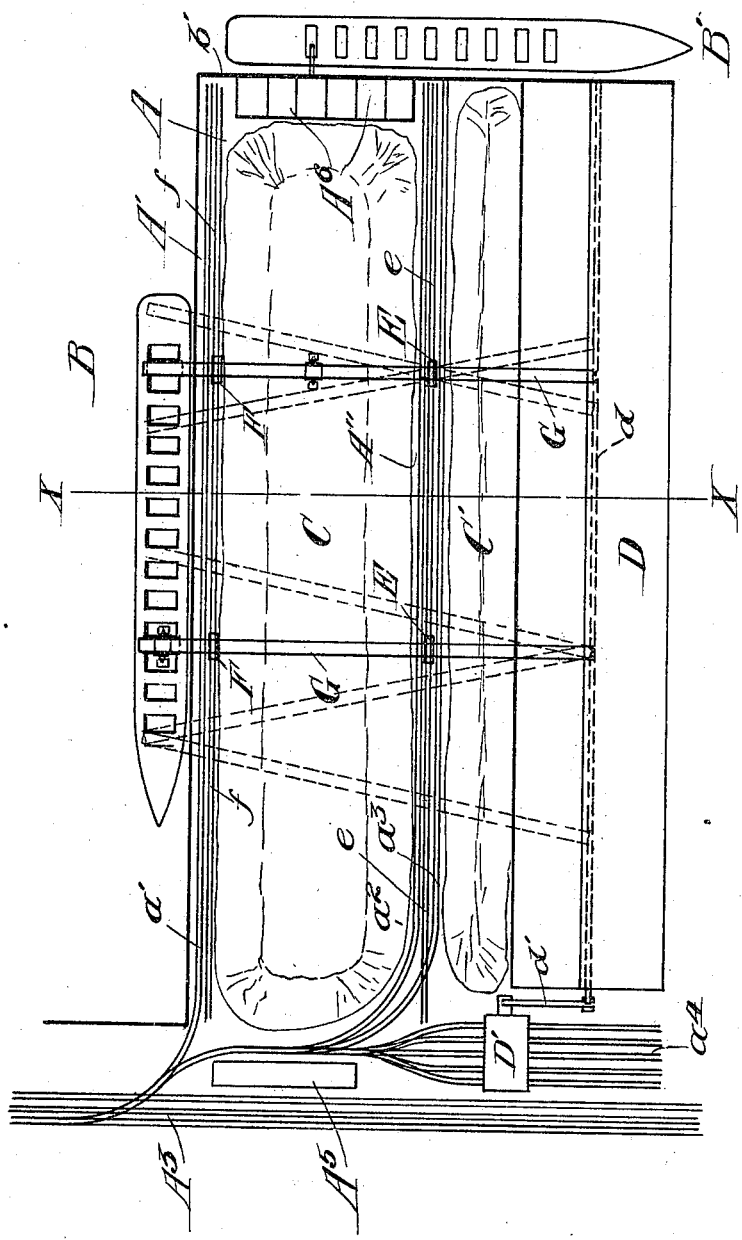

H. P. ANDRESEN.
HANDLING, UNLOADING, STORING, AND RELOADING PLANT.
APPLICATION FILED DEC. 19, 1908.

1,014,994. Patented Jan. 16, 1912.
6 SHEETS—SHEET 1.

WITNESSES:

INVENTOR
Herman P. Andresen
BY
ATTORNEY

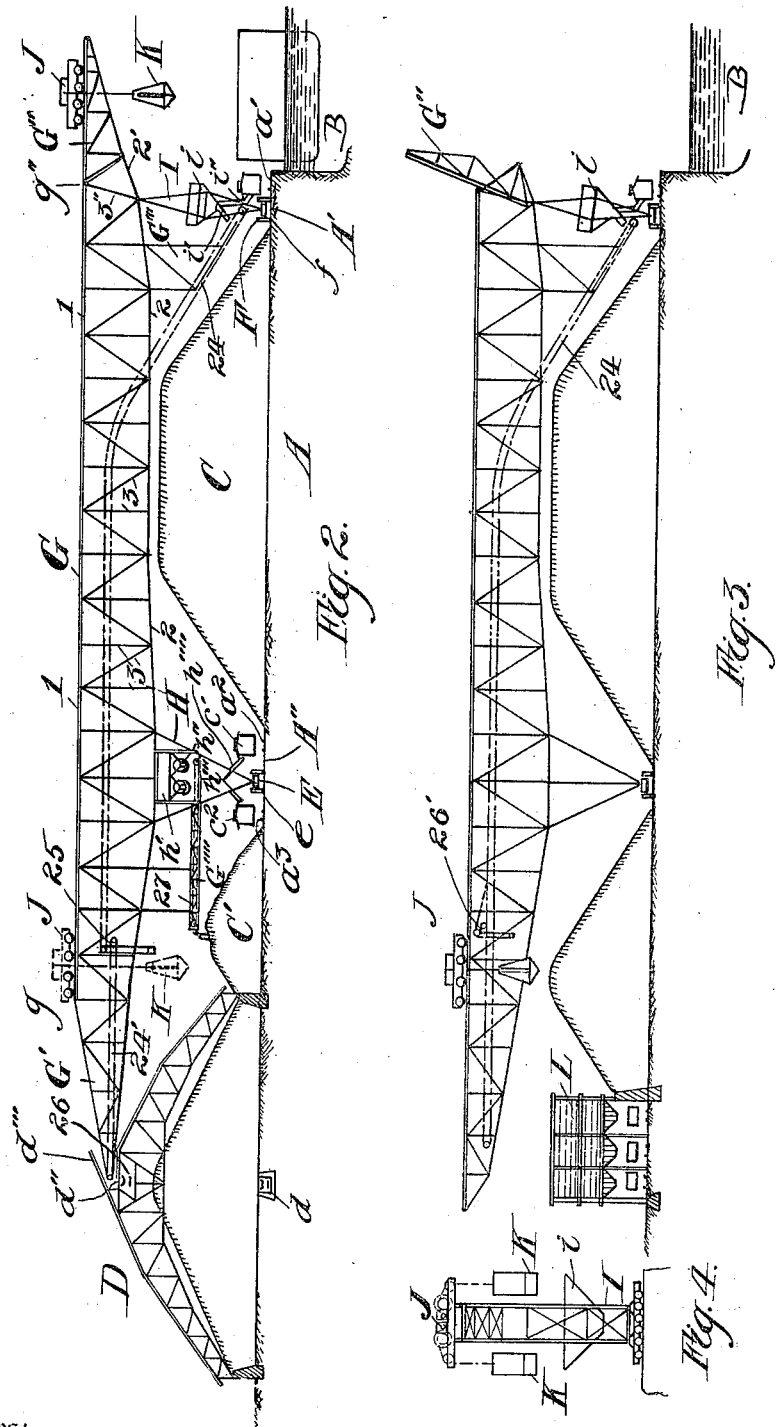

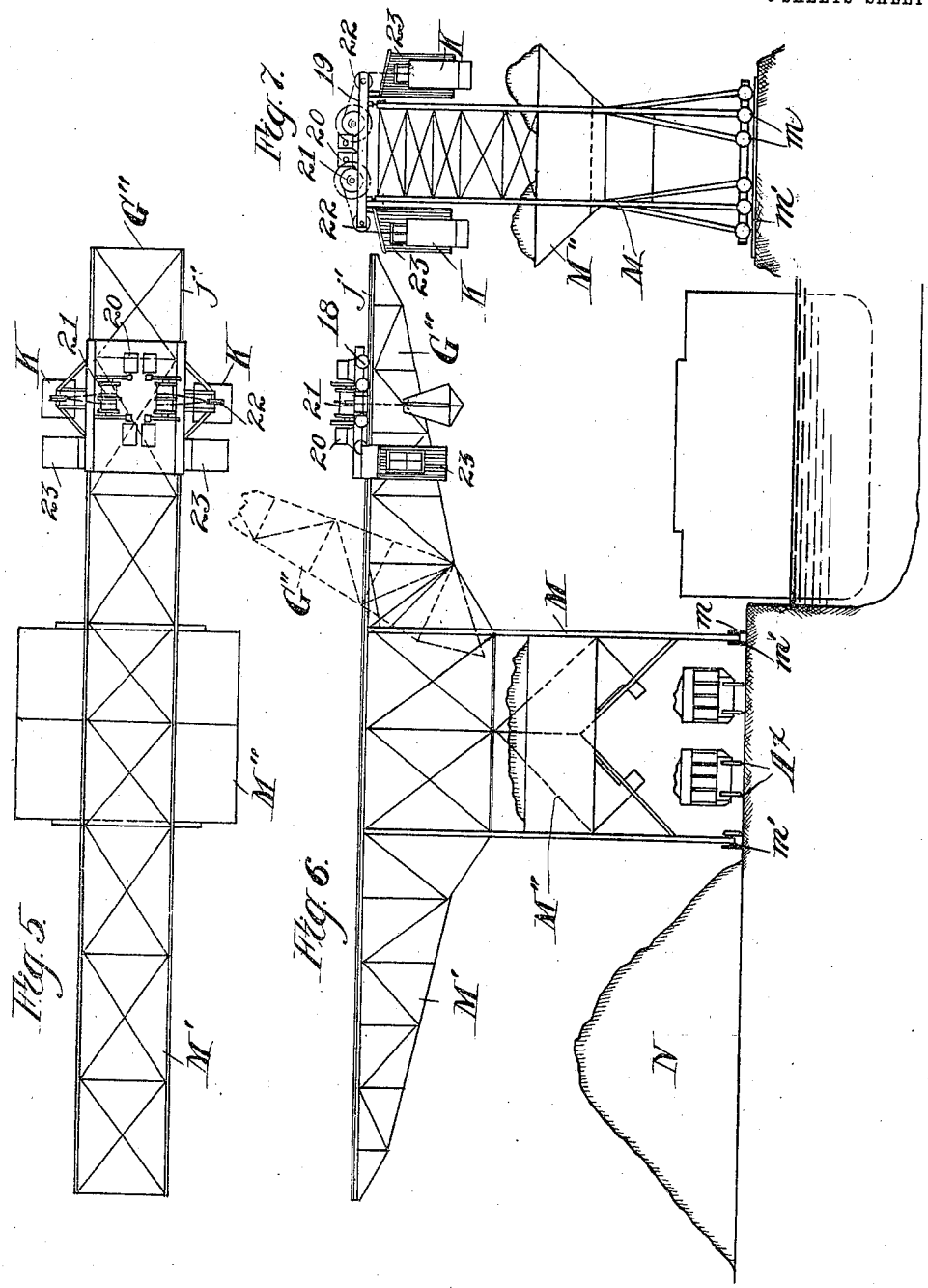

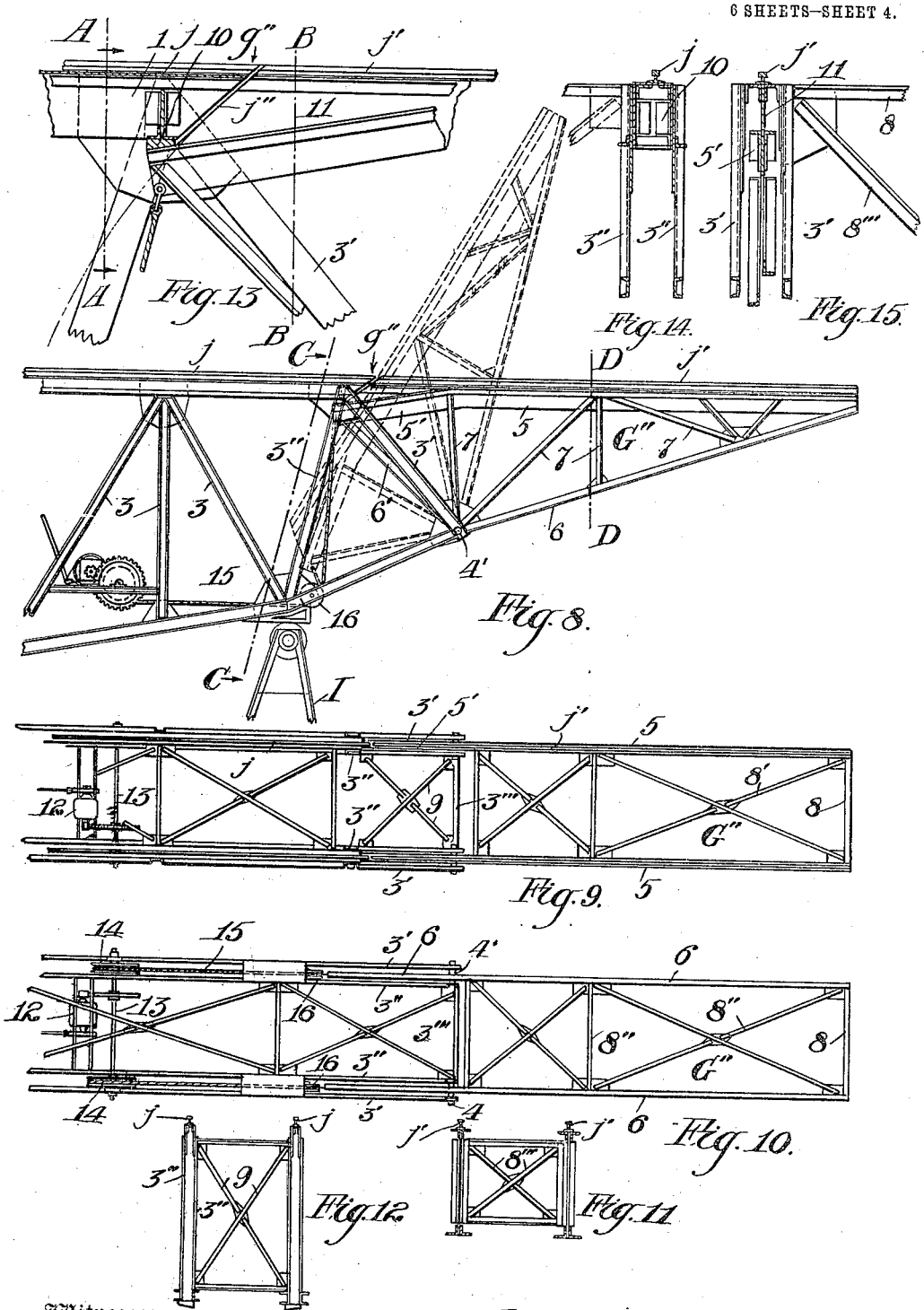

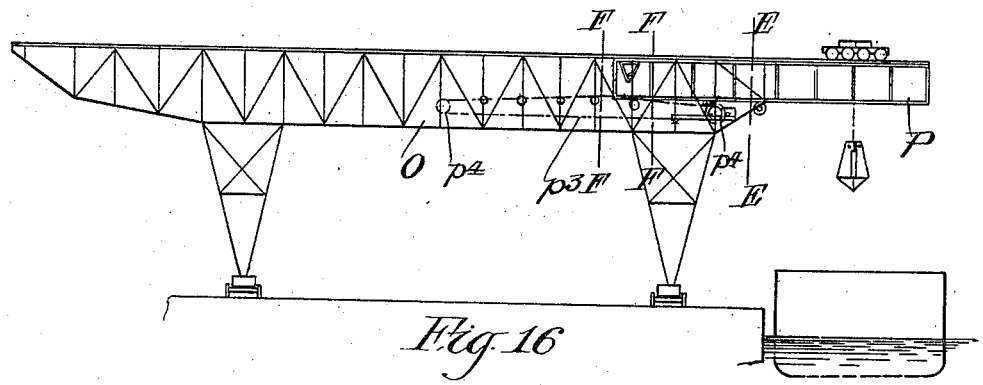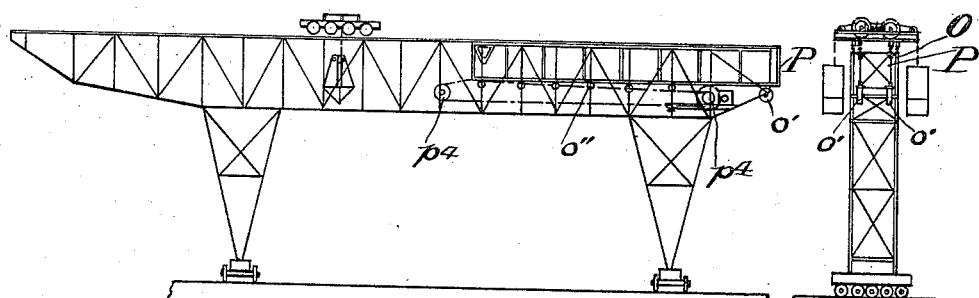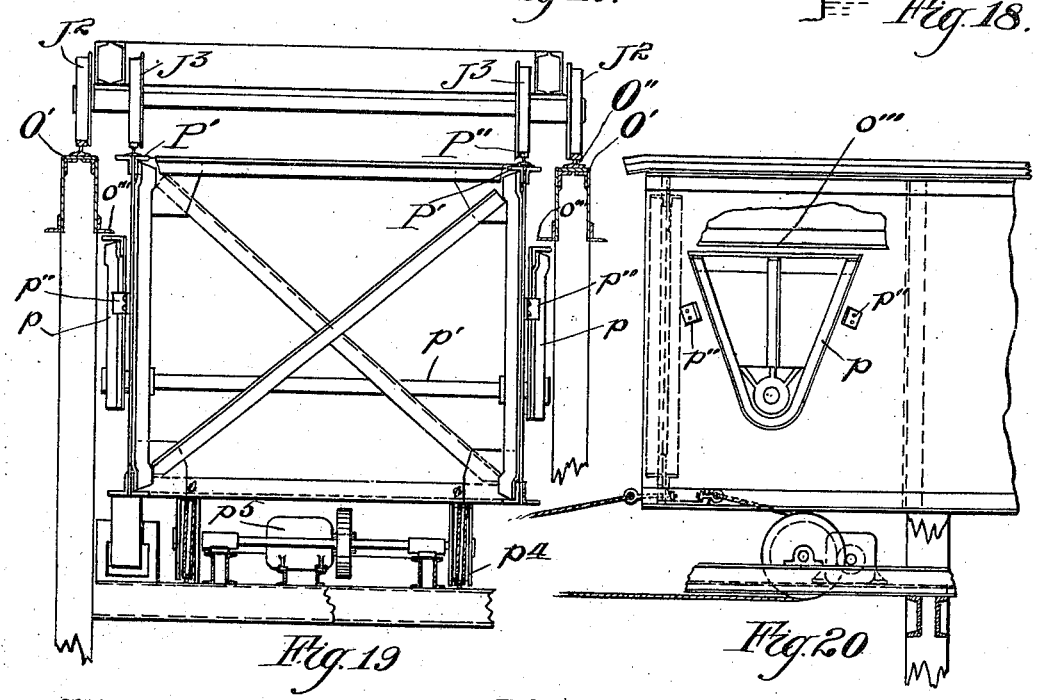

H. P. ANDRESEN.
HANDLING, UNLOADING, STORING, AND RELOADING PLANT.
APPLICATION FILED DEC. 19, 1908.
1,014,994.
Patented Jan. 16, 1912.
6 SHEETS—SHEET 6.
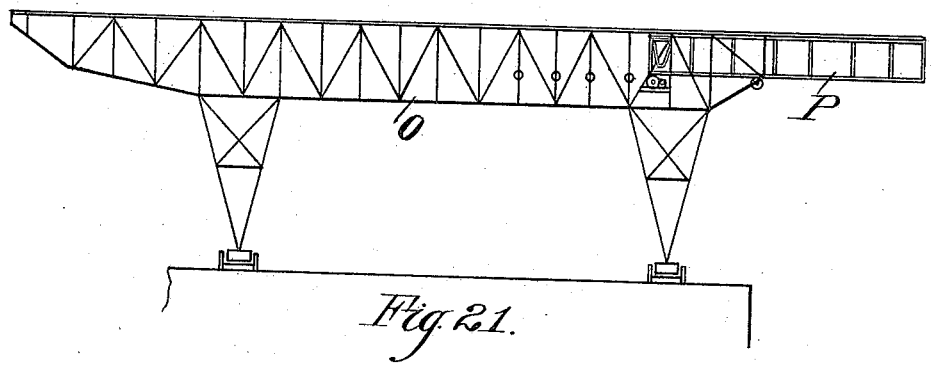
*Fig. 21.*
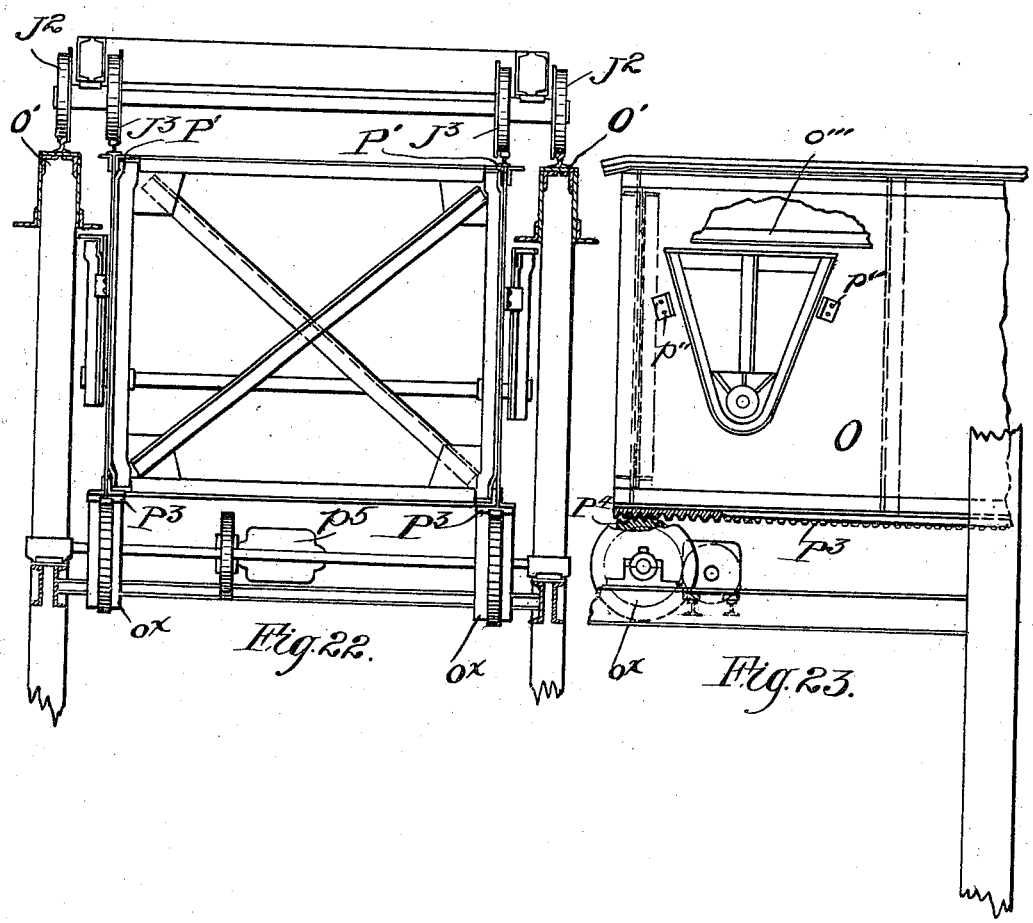
*Fig. 22.*   *Fig. 23.*
Witnesses:
R. W. McIlvaine
Arthur W. Nelson
Herman P. Andresen Inventor
By his Attorney

UNITED STATES PATENT OFFICE.

HERMAN P. ANDRESEN, OF CHICAGO, ILLINOIS, ASSIGNOR TO DAVID J. EVANS, OF CHICAGO, ILLINOIS.

HANDLING, UNLOADING, STORING, AND RELOADING PLANT.

1,014,994.  Specification of Letters Patent. Patented Jan. 16, 1912.

Application filed December 19, 1908. Serial No. 468,295.

*To all whom it may concern:*

Be it known that I, HERMAN P. ANDRESEN, a citizen of the United States, and resident of Chicago, Cook county, Illinois, have invented certain new, useful, and Improved Handling, Unloading, Storing, and Reloading Plants, of which the following is a full, clear, and exact description, such as will enable others skilled in the art to which it appertains to make and use the same.

My invention relates to improvements in plants for handling, unloading, storing and reloading such materials as coal and ore and has special reference to improvements in carriers for grab bucket trolleys, usually classed as ship unloaders and conveying bridges or cranes.

My invention also relates to a novel plant, lay-out or plan and special arrangements of tracks, storage piles, buildings and traveling parts, designed to secure maximum capacity and economy of construction and operation.

My invention will be most readily understood by reference to the accompanying drawings forming a part of this specification and in which:

Figure 1 is a plan view of a dock or plant embodying my invention; Fig. 2 is an enlarged vertical transverse section or elevation of the plant, substantially on the line X—X of Fig. 1; Fig. 3 is a similar view of a plant of modified form, especially designed for the handling of ore; Fig. 4 is an end elevation of the traveling bridge and unloader shown in Fig. 1; Fig. 5 is a plan view of an independent unloader, i. e. independent of a traveling bridge, embodying my invention; Fig. 6 is a side elevation thereof; Fig. 7 is an end elevation of the unloader; Fig. 8 is an enlarged side elevation of the movable member of the unloader, as it appears on both the independent unloader tower and the end of the traveling bridge; Fig. 9 is a top view thereof; Fig. 10 is a bottom view; Fig. 11 is a cross section on the line D—D of Fig. 8; Fig. 12 is a similar section on the line C—C of Fig. 8; Fig. 13 is a still further enlarged detail of the juncture between the main structure and the movable member of the unloader; Fig. 14 is a sectional detail on the line A—A of Fig. 13; Fig. 15 is a sectional detail on the line B—B of Fig. 13; Fig. 16 is a side elevation of a modified form of my traveling bridge and unloader; Fig. 17 is a similar view showing the unloader telescoped or retracted; Fig. 18 is an end view of the bridge shown in Figs. 16 and 17; Fig. 19 is an enlarged vertical section on the line E—E of Fig. 16; Fig. 20 is an enlarged side elevation, showing in detail parts of the unloader and operating mechanism therefor appearing between the lines F—F, F—F of Fig. 16; Fig. 21 is an elevation similar to Fig. 16, but showing a different operating mechanism for the movable member or boom; and Figs. 22 and 23 are enlarged sectional and side views, taken from Fig. 21.

In order that the features and functions of my invention may be quickly understood, it may here be explained that the primary object of the invention is to provide coal and ore plants which shall be of maximum capacity for the area covered;— and incidentally, to provide an improved, compact, economical plant for handling, unloading and storing materials both in the open and under cover;—to employ the handling machinery also for re-loading purposes;—to provide a bridge of short span and yet capable of the width and scope of distribution demanded;—to provide a traveling bridge and carrying mechanism of such character that a minimum length or portion of the bridge shall be subjected to heavy loading, so that much of the structure may be of relatively light construction;—to provide, in a single plant, efficient means for handling and storing several kinds of ore or coal, and to provide for the screening of the latter;—to provide a traveling bridge plant in which traveling belts or conveyers shall perform the greater part of the distribution, to the end that the grab bucket shall be free to operate more rapidly, as in the hold of a vessel;—to provide an unloader which shall be capable of removing material simultaneously from two boat hatches;—to provide an unloader which shall be of simple, economical construction and which shall be adapted for such movement above vessels as is necessary to shift the unloader or bridge past the masts thereof;—to provide a combined traveling bridge and unloader of such construction that great quantities of material may be speedily handled with a minimum expenditure of power;—to improve the relative arrangement and the construction of traveling bridges, conveyers and storehouses with a view to increasing the speed of handling material and the capacity of such houses;— to effectively combine screening means with the storage portion of the plant; and, to provide means whereby stored materials may be economically reloaded into cars or vessels at either end of the bridge.

Referring now to the drawings, A, represents a dock having water ways or slips, B and B', at its side and end. This dock, perhaps 1500 feet long and 750 feet wide, affords space for the storage of an immense quantity of bulk material, such as ore or coal. The spaces for the piles of material are laid out and the handling machinery is constructed and arranged in a manner which admits of the storage of a maximum quantity of material upon the dock and with a view also to facilitating the handling of the material from ships or cars to the storage piles, and vice versa.

The plant depicted in Fig. 1 is particularly designed for the handling of various kinds of coal and therein, C represents the soft coal stock pile; C', the screening pile, and D, the hard coal storage house. From Figs. 1 and 2 it will be seen that these stock piles are substantially as long as the dock and together take up practically the whole width of the dock or yard. There are but small spaces remaining unoccupied by the material. These are substantially limited to the narrow space, A', at the dock front and the narrow space, A'', between the piles, C and C'. In the parallel areas, A' and A'', I lay down tracks, $f$ and $e$ respectively, for the cars or carrying trucks, F and E, of the hereinafter described traveling bridges or cranes, G. At the dock front I also preferably lay down a parallel track, $a'$, for freight cars, which it may be desired to load direct from a vessel or from an adjacent portion of the stock pile, C. On either side of the track, $e$, I place parallel freight car tracks, $a^2$ and $a^3$, for freight cars, $c'$ and $c^2$, to be loaded by grab bucket operations upon the piles, C and C', respectively. The tracks, $a'$, $a^2$ and $a^3$, join the main tracks, $A^3$, at the inner end of the dock and terminate at the outer end of the dock as shown in Fig. 1. The bridge carrying tracks, $f$ and $e$, preferably extend the full length of the dock. The storage house, D, is not as long as the dock and between the end thereof and the main line tracks, $A^3$, I construct a hard coal screening and sorting house, D'. The house, D', is elevated above the ground and to provide for the rapid loading of cars therefrom, I lay down a number of tracks, $a^4$, connected with the other car tracks and adapted to accommodate several trains of cars, which may be shifted longitudinally, a car at a time, beneath the pockets in the screen house, to accomplish the rapid loading of the cars. This arrangement of tracks and screen house is most advantageous, as back and forth shifting of single cars is obviated and the locomotives used for drawing the cars are not required to run out upon the dock, but work exclusively at the land end thereof and do not interfere with the working of soft coal trains on the tracks, $a'$, $a^2$ and $a^3$. The screen house is supplied with material from the storage house, D, by means of a long conveyer, $d$, preferably extending longitudinally thereof and at its inner end joined to the screen house proper by an elevating conveyer, $d'$. The arrangement of tracks at the inner end of the dock, as shown, provides space for the necessary offices and shops, $A^5$, of the plant. Aside from this and the storage house, D, the only structure in the nature of a building is at the outer end of the dock and consists of a series of coal pockets, $A^6$, arranged between the parallel tracks and immediately adjacent to the edge of the dock front, $b'$. These coal pockets may be filled directly from an unloading vessel by means of the traveling bridge and are used for fueling ships as depicted in Fig. 1. Docks having both side and end water ways may thus easily be adapted to the purposes of both storage and fueling docks with the utmost economy of space and machinery. Where the dock front is limited to one margin of the land, I preferably arrange the coal pockets at the end of the dock in position to be bridged and filled by the traveling bridge. For many reasons of convenience the pockets, $A^6$, are thus best located at the end of the dock, where a ship may approach and be fueled without interfering with other vessels that may be unloading at the main dock front.

The plant shown in Fig. 1 has two traveling bridges, G, G, the trucks or cars, E, F, of which travel upon the tracks, $c$ and $f$, respectively. The bridges span the yard or dock and as they are identical in construction and operation the description of one will serve for both. One end of the bridge, G, overhangs the slip, B, and the other end, the storage house, D. The bridge is operable from end to end of the tracks, $e$ and $f$; i. e. the dock, and is adapted to assume various angular positions as indicated by dotted lines in Fig. 1. The cars, E and F, are equipped with motors (not shown) for moving the bridge upon the tracks, said motors being geared to the wheels of respective cars. Other means may be substituted for moving the bridge without departing from my invention.

Though my invention is by no means limited thereto, I prefer to employ bridges of the order shown in Letters Patent No. 903,806 granted to me November 10, 1908. The traveling bridge or crane, G, of Figs.

1 and 2, contains the essential features of the patented bridge; to which I have, in the present case, added other features that adapt it to all the special uses of a handling plant.

The bridge proper, G, may be considered as a single beam or girder supported by the towers, H and I, and carrying the trolley, J, from which the grab buckets, K, are suspended. The normal position of the bridge is that in which it is at right angles to the tracks $e$ and $f$, but it is not limited to operation in this position or relation; instead it is adapted to be moved into various angular positions with respect to the tracks as indicated in Fig. 1. This is accomplished by moving one of the carrying cars or trucks ahead or in advance of the other. The movement of the bridge out of right angled position with respect to the tracks obviously increases the distance between the cars or trucks E and F, changing the relations between the cars and the bridge proper. It is therefore impracticable to use towers which rigidly connect the bridge and the cars; first because such rigid connections would prevent turning or angular movement of the bridge with respect to the cars and tracks and second because the cars, being on parallel tracks, would not be permitted to move toward or from each other, as occurs when one or the other is advanced or retarded with respect to the other. To allow maximum freedom of movement and adjustment, I employ one rigid tower and one pivotal or compensating tower. The rigid tower, H, is framed into the bridge structure and prevents longitudinal movement of the bridge. The other tower, I, is in the nature of a vertical link or strut which is pivoted to the bottom of the bridge and to the top of the car, F, or otherwise, in such manner as to permit the car to move back and forth beneath the upper pivotal point of the tower, $i. e.$ beneath the bridge. The twisting or turning of the bridge with relation to the cars is permitted by a vertical pivot or turn table, not shown, which I interpose between each of the cars and the bridge. In the case of the rigid tower, I preferably arrange the turn table between the car, E, and the lower end of the tower, whereas, the lower end of the compensating tower, I, is pivoted on the car, F, a long pivot or hinge extending longitudinally of the car being used, and the necessary vertical pivot or turn table (see Fig. 8) is arranged between the upper end of the compensating tower, I, and the bridge. The tower, H, therefore, is adapted to turn upon its vertical axis and with respect to the car which supports it, whereas the tower, I, is free to swing or sway upon its car, and does not turn about a vertical axis thereon; but the bridge is free to turn upon the upper end of the pivotal or compensating tower and is thus permitted to assume any desired relation to this non-turning compensating tower.

It will be noted that the top of my bridge is straight and that the trolley, J, is mounted on the top or top chord thereof with the buckets hanging at the sides of the bridge. The advantage which attaches to this construction is that the buckets may be hoisted above the lower chord of the bridge. It follows that the buckets may be moved from end to end of the bridge while thus suspended and it is not necessary to allow clearance beneath the bridge for their passage over the tops of the stock piles. The buckets may be dumped or opened while in highest position and therefore the stock piles may reach practically to the lower chord of the bridge, small clearance being necessary to permit the free movement of the bridge along the tops of the stock piles. The height of the towers is determined by the height to which it is desired to pile the material. A bridge of my construction adapted to pile the material to the same height is therefore much lower and more stable, than others; reversely, when made of the same height as other bridges it permits the stock to be piled to greater heights.

A further special advantage of my bridge is that the points at which it is supported do not vary but remain constant for all positions of the bridge and cars. At one end it is supported by the rigid tower which does not vary its position, and at the other end it is supported by a pivot bearing, which is also fixed; in other words the bridge span is constant for all positions of the cars or trucks; hence the dead load strains of the bridge proper are constant. The towers are therefore constructed to sustain definite vertical dead load reaction, and as it is unnecessary to design either bridge or tower to take loads for minimum and maximum length of span, the whole structure is of considerably less weight than other structures of the same dimensions and capacity.

A still further advantage of my invention resides in the fact that the bridge is a substantially solid structure. The trolley and grab buckets do not travel between or through any of the trusses or chords as in other bridges, but instead are exterior to the structure making it possible to effectively tie and brace the bridge throughout, as well shown in the drawings. A narrower bridge results and, as shown in the drawings, I am able to dispense with the usual floor beams and stringers or hangers for the trolley rails and place the latter directly upon the top chords of the bridge.

Referring to the drawings for further details of construction, it will be seen that the bridge portion of my novel apparatus is a simple truss or beam of considerably greater height than width. It is composed of the straight upper members, 1—1, constituting the top chords of the bridge and the bottom members, 2—2, which join the ends of the top chords in different ways and constitute the bottom chords of the bridge. These chords are united by vertical, horizontal and diagonal members, 3—3, and therewith make a very rigid structure. The rails, 4—4, for the trolley, J, are fastened upon the tops of the chords, 1—1. At the land end the bridge proper may be said to terminate at the point, g, substantially above the inner side of the house, D, but as the bridge is intended to convey coal to the house, D, it is provided with a light frame work or extension, G', which reaches to the center line of the building above the roof thereof. This extension need be only strong enough to support the comparatively small weight of the hereinafter described conveyer and the material thereon. The trolley does not run upon the extension and the latter may be constructed in any desired way to accommodate the same and its conveyer to the building D which may be either higher or lower than the bridge.

The outer end of the bridge may be said to terminate at a point $g''$ substantially above the edge of the dock, in other words, out of reach of the rigging of vessels lying at the dock, to allow free movement of the bridge when a vessel is lying alongside. The top chords, 1, of the bridge are preferably U-shaped in cross section, as shown in Figs. 13 and 14, and end at points $g''$. The terminal members of the bridge are triangular panels comprising the members 2' and 3' with the uprights 3''. The panels are joined by cross pieces 3 at the upper and lower ends of the strut 3'' (see detail Figs. 8 to 15). The juncture points of members 2' and 3' at opposite sides, are joined by a cross piece 3''' and diagonals, as shown in Fig. 10. At these points I provide pivots 4'—4' for the movable uploader extension or member G'' which operates after the manner of one member of a bascule bridge.

The movable member G'' is a lever-like boom that is pivoted on the end of the bridge G, below the top thereof. As shown by full lines in Fig. 3 and by dotted lines in Fig. 8, the member G'' is adapted to assume a substantially upright position on the end of the bridge. In such position it is beyond the reach of ships' rigging and the bridge may be freely moved from one hatch to the next of the vessel, or as is occasionally done, the vessel may be moved along the dock without interference with the bridge. When the movable member G'' is lowered, its top chords form extensions of the bridge G and these parts engage to transmit to the bridge the strains imposed upon the movable member when the trolley is moved out upon the same. The trolley rails, j and j', are clearly shown in Figs. 8 to 15. The rails, j, are placed directly on the top of the top chords of the bridge and in like manner the rail extensions, j', are placed on the top chords 5 of the pivoted extension or movable member, G''. The member being in working position, the ends of its rails, j', aline with the rails, j, on the bridge forming an uninterrupted track which extends out over the vessel from which position the grab buckets on the trolley may be lowered into the hatches of the vessel. The sides of the movable member are triangular trusses each comprising a top chord 5 and bottom chords, 6 and 6', the latter uniting at the pivot point, and the chords being joined by struts and braces, 7. For the major portion of their length the chords, 5, 5, are joined by braces, 8, and diagonals, 8'. In like manner the chords 6, 6, are joined by braces and diagonals, 8'', as shown in Fig. 10. The trusses are additionally joined by transverse diagonals, 8''', as shown in Fig. 11. I arrange the end of the member, G, to revolubly telescope with the end of the bridge and place the entire operating mechanism and the abutments or stops within the outlines of the bridge structure. To this end I preferably employ bridge members, 3' and 3'', which are divided as shown in Figs. 9, 10, 12, 14 and 15, between which the rear ends, 5', 6', of the member, G, may play. The inner parts of the members, 3' and 3'', may be joined by ties and braces, 9, as shown in Figs. 10 and 12, without interfering with the tilting movement of the member, G, which has no braces between the rear ends of its side trusses. I prefer that the rear ends of the chord, 5, shall be bent down slightly as shown in Figs. 8 and 13, so that they may be beneath the chords, 1, of the bridge and within the latter I arrange the abutments, stop blocks or diaphragms, 10. The abutments, 10, serve as stops for the member, G, and hold it level with the top of the bridge. A close joint is made between the rails j, j', by cutting the same and the top chords i. e. causing them to meet, on an angle, j''', as shown in Figs. 8 and 13, and the inner ends of the rails, j', are supported on the web plates, 11, on the inclined or bent ends, 5', of the member, G. As the member, G, is intermediately pivoted it is obviously partially balanced and may be operated readily. Counter weights may be added if desired.

Any suitable means, such as a locking pin or bolt at the abutments, may be used to prevent the accidental tilting of the pivoted extension when in use. A motor, 12, is mounted within the frame of the bridge and operates a jack shaft, 13, on which are winding drums, 14. Cables, 15, lead from the drums over sheaves, 16, and are attached to the rear ends of the movable member, G. By operating the motor the cables may be wound on the drums to draw down the inner end of the member, G'', to lift the latter into closed or inoperative position. A brake on the motor shaft enables the operator to gently stop the movement of the member G'' and to secure the same in raised position.

The manner of using the trolley on the unloader extension of the bridge is clearly depicted in Figs. 1 and 2 and in Figs. 5, 6 and 7. I have shown the trolley and the grab buckets in detail. While the tower there shown differs from the bridge, the movable member G'' and the trolley are identical. The trolley wheels 18 run upon the rails and the frame 19 of the trolley is wider than the bridge and hence overhangs both sides thereof. On the frame I mount the motors and winding drums 20, 21 and the cable sheaves 22, the latter projecting considerably beyond respective sides of the bridge and movable section. The grab buckets K, K hang from the sheaves 22 and the distance between the centers of the grab buckets equals the distance between the hatches of a ship. It follows therefore that with one trolley I am able to work two grabs and unload from two hatches at once. This is clearly shown in Fig. 1. The cabs 23, 23 for the two operators preferably hang from opposite sides of the trolley. These contain the electric controllers of respective trolley motors, also the means governing the propulsion of the trolley on the bridge.

Referring again to Figs. 2 and 4, it will be noted that the tower I carries a large hopper $i$ the ends of which project far enough to receive the contents of the grab buckets, when after they are filled, the trolleys move back over the hopper. The hopper $i$ is framed into the tower and is substantially an integral part thereof. It is provided with two spouts $i'$ and $i''$, the latter being of service in loading cars on the track, $a'$ direct from the hopper, $i$. Below the spout, $i'$, and preferably supported by the depending frame, G''', is a conveyer, 24, arranged to receive material from the hopper, $i$. This conveyer, 24, rises at a suitable angle and entering the frame work of the bridge, G, extends landward therein. It is supplemented by a conveyer, 24', in the extension, G'. In practice the conveyers, 24 and 24', may be united in one. Whether one or two conveyers, a tripper or spout, 25, is provided above the screenings pile, C'. The roof of the building, D, contains a long slot, $d''$, into which the conveyer, 24', is adapted to discharge material. Beneath the slot is a conveyer, 26, extending lengthwise of the house and provided with a tripper and spout, not shown, for distributing material to different points in the house. The opening in the roof is covered by a roof extension or shield, $d'''$, which excludes rain and snow.

Within the tower, H, I construct a screening plant for soft coal. This structure comprises one or more large hoppers, $h'$, which project from the sides of the tower like the hopper, $i$, so that the hopper may be loaded by means of the grab buckets. Suitable screens, $h''$, are arranged in the hopper and the dust or screenings fall upon the conveyer, 27, which is supported in the suspended frame, G''''. The chunks of coal fall into hoppers, $h'''$, below the main hoppers, $h'$. Spouts, $h''''$, provide for the loading of the contents of the hoppers into the cars, $c'$ and $c^2$. The arrangement is such that coal may be taken direct from the piles C and C', and loaded into the cars direct by means of the grab bucket, the hoppers projecting from the towers, H, and in no wise interfering.

The use and operation of the coal handling plant illustrated in Figs. 1, 2 and 3, will as a rule be as follows:—Ordinarily the unloader boom or member, G'', is in elevated position. At such times the trolley and buckets may be worked back and forth on the bridge as required to rehandle stock from the piles, C, C', into the cars upon the tracks, $a'$, $a^2$ and $a^3$, or to load the fueling hoppers, $A^6$. When necessary the rehandling may be done through the medium of the large hoppers or pockets, $i$ and $h'$, on the towers, I and H. The screening of soft coal may be carried on at any time. Obviously also, hard coal may at any time be removed from the house, D, by means of conveyer, $d$, and the loading of trains may be continuously carried on at the house, D'. When a vessel approaches the dock and has been moored thereto to be unloaded, the bridge is moved to position above the hatches from which coal is to be taken. The unloader boom is then lowered and the trolley is run out upon the boom. The two buckets are then dropped through adjacent hatches and when filled and closed are hoisted to position close beneath the trolley. If the ship's cargo consists of soft coal, the trolley is immediately moved back upon the bridge and the contents of the buckets are dumped upon the stock pile, C. In unloading screenings, in this manner, the trolley has farther to travel upon the bridge to dump the buckets upon the screenings pile, C'. It will be noted that a very short trolley travel is required in handling soft coal from the ship to the pile, C. If the ship's cargo consists of hard coal, the unloading travel of the trolley is still further shortened, for in such case its movement is limited substantially to the length of the unloader boom, the hard coal being hoisted from the vessel and deposited in the hopper, $i$. From thence the hard coal is carried across the yard by the conveyer, 24, which deposits it in the storehouse. Obviously a great deal of time is saved. Screenings may be handled by means of the hopper, $i$, conveyer, 24, and spout, 25, when desired and in practice it is rarely necessary to run the unloading trolley beyond the high point of the pile, C, in a landward direction. An advantage which grows out of this, is that a second trolley and another pair of grab buckets may be used on the landward end of the bridge, for the rehandling of stock from piles, C and C′, while the unloading of a ship is going on at the dock front end of the bridge. The bridge may be swung to any desired position across the yard without interfering with any of the handling or rehandling operations and when it is necessary to move the bridge from one pair of hatches to another, such movement is but slightly delayed by the raising and lowering of the unloader boom.

The plant illustrated in Fig. 3 is a typical ore handling plant embodying my invention. As it is unnecessary to store ore and rock under cover, I here dispense with the storage house before described and erect a series of pockets, L in its place and lengthen the bridge to permit the loading of the pockets by the trolley. I, however, still retain the hopper, $i$, and the conveyer, 24, as a means of loading cars on the dock front and to minimize the length of travel of the trolley. A movable tripper, 26′, permits the distribution of the material to either of the stock piles and in unloading vessels, I prefer to use the hopper, $i$, and conveyer, exclusively, thereby accomplishing a great saving of time. Where a long conveyer bridge is not needed, I employ the simplified form of the invention which is shown in Figs. 5, 6 and 7, the same comprising a movable unloader tower. The tower, M, has a cantaliver extension, M′, on its landward side which matches the pivoted cantaliver or boom, G″. The tower has trucks, $m$, and runs on rails, $m'$, so that it may be readily positioned over the vessel. Between the tracks, $m'$, I lay down freight car tracks, $A^x$, and the tower contains elevated hoppers, M″, which project as shown in Figs. 5 and 6; from these the cars on the tracks, $A^x$, are loaded. The trolley is adapted to move from end to end of the tower, and its cantalivers to transfer material to or from the vessel and the stock pile, N.

A modified form of my combined unloader and bridge is shown in Figs. 16 to 20 wherein, O, represents the movable bridge or tower and P, the movable unloader boom. In this case the boom, P, is in the form of a plate girder and the same and the bridge are adapted to telescope as shown in Fig. 17. Large rollers, $o'$, and other rollers, $o''$, at the end and within the body of the bridge carry the boom, P. The upward thrust of the inner end of the boom is cared for by the chord angles acting as guide rails, $o'''$, on the sides of the bridge structure and abutments, $p$, on the boom, P. To properly distribute this thrust to the guide rails, I preferably pivot the latter on the cross shaft, $p'$, and allow the abutments slight latitude of movement between the stops, $p''$, on the sides of the boom. The means for moving the boom in and out may comprise endless cables, $p^3$, attached to the rear end of the boom and passing over sheaves, $p^4$. One pair of sheaves serve as winding drums, the cables being wound several times about the same; and to these I connect an operating motor, $p^5$. The sheaves, $p^4$, and the motor are held in the frame of the bridge and it is obvious that the operation of the motor will impart movement to the telescoping boom. The top chords, P′, of the boom are both parallel and level with the top chord, O′, of the bridge and carry rails, P″, parallel with the rails, O″, on the bridge. As the rails are not alined, I provide the trolley with an extra set of flanged wheels, $J^3$, and the arrangement is such that before the wheels, $J^2$, leave the rails, O″, the wheels, $J^3$, pass onto the rails, P″.

A different boom operating mechanism is shown in Figs. 21 to 23, the same comprising gear racks, $P^3$, on the boom, O, and motor driven gears, $P^4$, on the bridge frame. I prefer that the operating gears, $P^4$, which mesh with respective racks, $P^3$, shall be shrouded in two of the carrying rolls, $o^x$. It should be understood that these telescoping booms are quite as well adapted for use upon single tower unloaders as upon traveling bridges. I regard as most important the primary feature which consists in supporting and operating the unloader boom or extension, whatever its form, at points beneath the top of the bridge or tower, whereby superstructures and laterally projecting members are rendered unnecessary.

As various modifications of my invention will readily suggest themselves to one skilled in the art, I do not confine the invention to the specific structures herein shown and described.

Having thus described my invention, I claim as new and desire to secure by Letters Patent:

1. The improvements herein described comprising a storage dock having parallel stock pile spaces, in combination with tracks arranged at the dock front and between said spaces, a storage house at the landward side of said spaces, a traveling bridge constructed to travel on said tracks, and to overhang said storage house, a hopper at the dock end of said bridge and a conveyer carried by said bridge for carrying material from said hopper across said spaces to said house, substantially as described.

2. The improvements herein described, comprising a storage dock having parallel stock pile spaces, in combination with tracks arranged at the dock front and between said spaces, a storage house at the landward side of said spaces, a traveling bridge constructed to travel on said tracks and to overhang said house at the landward end, a hopper carried by the dock front end of the bridge, unloading means at said end of said bridge to deposit material in said hopper and a conveyer carried by said bridge for carrying material from said hopper to said house, substantially as described.

3. The improvements herein described, comprising a storage dock having parallel stock pile spaces, in combination with tracks arranged at the dock front and between said spaces, a storage house, having a receiving conveyer extending from end to end at the top, said house arranged at the landward side of said spaces, a traveling bridge constructed to travel on said tracks, a hopper carried by the dock front end of the bridge, unloading means at said end of said bridge to deposit material in said hopper and a conveyer carried by said bridge for carrying material from said hopper to the receiving means at the top of said house, substantially as described.

4. The improvements herein described, comprising a storage dock having parallel stock pile spaces, in combination with tracks arranged at the dock front and between said spaces a storage house at the landward side of said spaces, having a receiving opening in its roof, a traveling bridge constructed to travel on said tracks and extending from the dock front to the opening in the roof of said house, an unloader boom or movable extension at the dock front end of said bridge, a grab bucket operating trolley movable on said bridge and boom, a grab bucket, a hopper carried by the dock front end of said bridge to receive material from said bucket and a conveyer carried by the bridge and arranged to convey material from said hopper to the opening in the roof of said house, substantially as described.

5. The improvements herein described, comprising a storage dock having parallel stock pile spaces, in combination with tracks arranged at the dock front and between said spaces a storage house at the landward side of said spaces, having a receiving opening in its roof, a traveling bridge constructed to travel on said tracks and extending from the dock front to the opening in the roof of said house, an unloader boom or movable extension at the dock front end of said bridge, a grab bucket operating trolley movable on said bridge and boom, a grab bucket, a hopper carried by the dock front end of said bridge to receive material from said bucket, a conveyer carried by the bridge and arranged to convey material from said hopper to the opening in the roof of said house and means for discharging material from said conveyer at a point between said hopper and said house, substantially as described.

6. The improvements herein described, comprising a storage dock having parallel stock pile spaces, in combination with tracks arranged at the dock front and between said spaces, a storage house at the landward side of said spaces and having a receiving opening in its roof, a distributer operating longitudinally in said house, a bridge constructed to travel on said tracks and extending from the dock front to the opening in the roof of said house, an unloader boom or movable extension at the dock front end of said bridge, a grab bucket operating trolley movable on said bridge and boom, a grab bucket, a hopper carried by the dock front end of said bridge to receive material from said bucket and a conveyer carried by the bridge and arranged to convey material from said hopper to the opening in the roof of said house, substantially as described.

7. The improvements herein described, comprising a storage dock having parallel stock pile spaces, in combination with tracks arranged at the dock front and between said spaces a storage house at the landward side of said spaces and having a receiving opening in its roof, a distributer operating longitudinally in said house, a traveling bridge constructed to travel on said tracks and extending from the dock front to the opening in the roof of said house, an unloader boom or movable extension at the dock front end of said bridge, a grab bucket operating trolley movable on said bridge and boom, a grab bucket, a hopper carried by the dock front end of said bridge to receive material from said bucket, a conveyer carried by the bridge and arranged to convey material from said hopper to the opening in the roof of said house and means for, at will, discharging material from said conveyer, at a point between said hopper and said house, substantially as described.

8. The improvements herein described, comprising a storage dock having parallel stock pile spaces, in combination with bridge carrying tracks arranged at the dock front and between said spaces a storage house at the landward side of said spaces and having a receiving opening in its roof, a distributer operating longitudinally in said house, a bridge constructed to travel on said tracks and extending from the dock front to the opening in the roof of said house, an unloader boom or movable extension at the dock front end of said bridge, a grab bucket operating trolley movable on said bridge and boom, a grab bucket, a hopper carried by the dock front end of said bridge to receive material from said bucket, a conveyer carried by the bridge and arranged to convey material from said hopper to the opening in the roof of said house, means for, at will, discharging material from said conveyer at a point between said hopper and said house, and car tracks paralleling the bridge carrying tracks at the margins of said spaces, substantially as described.

9. The improvements herein described, comprising a storage dock having parallel stock pile spaces, in combination with bridge carrying tracks arranged at the dock front and between said spaces a storage house at the landward side of said spaces and having a receiving opening in its roof, a distributer operating longitudinally in said house, a bridge constructed to travel on said tracks and extending from the dock front to the opening in the roof of said house, an unloader boom or movable extension at the dock front end of said bridge, a grab bucket operating trolley movable on said bridge and boom, a grab bucket, a hopper carried by the dock front end of said bridge to receive material from said bucket, a conveyer carried by the bridge and arranged to convey material from said hopper to the opening in the roof of said house, means for, at will, discharging material from said conveyer at a point between said hopper and said house, car tracks paralleling the bridge carrying tracks at the margin of said spaces, a screening house at the end of said storage house, means for moving material from the latter to the former and a plurality of tracks beneath said screen house, substantially as described.

10. The improvements herein described, comprising a storage dock having parallel stock pile spaces, in combination with bridge carrying tracks arranged at the dock front and between said spaces a storage house at the landward side of said spaces and having a receiving opening in its roof, a distributer operating longitudinally in said house, a bridge constructed to travel on said tracks and extending from the dock front to the opening in the roof of said house, an unloader boom or movable extension at the dock front end of said bridge, a grab bucket operating trolley movable on said bridge and boom, a grab bucket, a hopper carried by the dock front end of said bridge to receive material from said bucket, a conveyer carried by the bridge and arranged to convey material from said hopper to the opening in the roof of said house, means for, at will, discharging material from said conveyer at a point between said hopper and said house, car tracks paralleling the bridge carrying tracks at the margin of said spaces, a screening house at the end of said storage house, means for moving material from the latter to the former and a plurality of track beneath said screen house, substantially perpendicular to the other tracks and house, substantially as described.

11. The improvements herein described, comprising a storage dock having parallel bridge carrying tracks, in combination with a storage house adjacent to the landward track, a combined traveling bridge and unloader constructed to travel on said tracks, said unloader comprising a trolley and grab bucket arranged to travel on said bridge, and a conveyer carried by said bridge to receive material from said bucket at the front end of said bridge, and adapted to carry material from the dock front end of the bridge across to said house, substantially as described.

12. The improvements herein described, comprising a storage dock having bridge carrying tracks parallel with its dock front and substantially perpendicular to its end, in combination with a combined traveling bridge and unloader constructed to travel on said track, said unloader comprising a trolley and grab bucket operable on said bridge, a hopper arranged upon and movable with the dock front end of the bridge, a conveyer mounted upon said bridge below the trolley track thereof and extending from said hopper upward and across said tracks and a plurality of fueling pockets arranged upon the end of the dock between said tracks in position to be filled from said bridge, substantially as described.

13. The improvements herein described, comprising a storage dock having bridge carrying tracks parallel with its dock front, in combination with a combined traveling bridge and unloader constructed to travel on said track, said unloader comprising a trolley and grab bucket movable along said bridge, a hopper permanently arranged upon and movable with the dock front end of the bridge and a conveyer mounted upon said bridge below the trolley track thereof and extending from said hopper upwardly and across said tracks to the land end of said bridge, substantially as described.

14. The improvements herein described, comprising a storage dock having bridge carrying tracks parallel with its dock front and substantially perpendicular to its end, in combination with a combined traveling bridge and unloader constructed to travel on said track, said unloader comprising a trolley and a grab bucket operable on said bridge, and a plurality of fueling pockets arranged upon the end of the dock between said tracks in position to be served by said bridge, substantially as described.

15. The improvements herein described, comprising a storage dock having parallel widely separated tracks, in combination with a traveling bridge, a trolley and grab bucket movable thereon, a storage house parallel with the landward track and underlying the landward end of said bridge in position to be continuously served thereby and fueling pockets upon the end of the dock in position to be also served by said bridge, substantially as described.

16. The improvements herein described, comprising a storage dock having bridge carrying tracks parallel with its dock front, in combination with a combined traveling bridge and unloader constructed to travel on said track, said unloader comprising a trolley and grab bucket adapted to travel along said bridge, a hopper arranged permanently upon and movable with the dock front end of the bridge, a conveyer mounted upon said bridge below the trolley track thereof and mainly within the bridge and extending from said hopper upward across said tracks and means for discharging material from said conveyer between the hopper and the end of the bridge, substantially as described.

17. The improvements herein described, comprising a storage dock having widely separated bridge carrying tracks, one adjacent to the dock front, a storage house adjacent to the landward track, a bridge having towers rising above said tracks, cars whereby they are movably mounted on respective tracks, a hopper carried by the dock front end of the bridge, unloading means at said end of said bridge to deposit material in said hopper and a conveyer carried by said bridge for carrying material from said hopper to said house, substantially as described.

18. The improvements herein described, comprising a storage dock having widely separated bridge carrying tracks parallel with its front, in combination with a combined traveling bridge and unloader boom mounted on said tracks, a storage house parallel with said tracks, a distributer in said house arranged to be constantly served by said bridge, a conveyer operating between the ends of said bridge, a trolley operable on said bridge and boom and provided with a bucket adapted to serve said conveyer, substantially as described.

19. The improvements herein described, comprising a storage dock having widely separated bridge carrying tracks parallel with its front, in combination with a traveling bridge arranged upon said tracks, a conveyer mounted upon said bridge for conveying material from end to end thereof, a hopper carried upon the dock front end of the bridge to serve said conveyer, suitable hoisting means on said bridge for serving said hopper and means for discharging material from said conveyer intermediately of its ends, substantially as described.

20. The improvements herein described, comprising a storage dock having widely separated bridge carrying tracks parallel with its front, in combination with a traveling bridge arranged upon said tracks, a conveyer mounted upon said bridge for conveying material from end to end thereof, a hopper carried upon the dock front end of the bridge to serve said conveyer, suitable hoisting means on said bridge for serving said hopper, storage means landward of said tracks to receive material from said conveyer and means for discharging material from said conveyer between said storage means and said tracks, substntially as described.

21. The improvements herein described, comprising a storage dock having widely separated bridge carrying tracks parallel with its front, in combination with a traveling bridge mounted thereon, ship unloading and conveying means upon said bridge, a hopper carried by the dock front end of said bridge, a conveyer extending therefrom to the landward end of said bridge, a storage house landward of said tracks, said house having a roof provided with a longitudinal opening beneath the end of the bridge and longitudinally operative distributing means at the opening in the roof of said house, substantially as described.

22. The improvements herein described, comprising a storage dock having bridge carrying tracks parallel with its front, in combination with a storage house landward of said tracks, a screening house at the end of said storage house, means for moving material from storage to screening house, a plurality of tracks at said screening house, car tracks adjacent to the bridge tracks and a combined traveling bridge and unloader mounted on said bridge tracks and arranged to serve said storage house and the space between the same and the dock front, substantially as described.

23. The improvements herein described, comprising a storage dock having parallel stock pile spaces, in combination with tracks arranged at the dock front between said spaces, a storage house parallel with the landward storage space and provided with distributing means in its top or roof, car tracks adjacent to the first mentioned tracks, a traveling bridge having towers rising from the first mentioned tracks, means whereby the bridge is adapted for movement thereon, an unloader boom arranged for projection upon the dock front end of the bridge, a trolley and grab bucket operable on said bridge and boom, a conveyer arranged on said bridge and adapted to receive material at the dock front end thereof and transfer it to the distributer in said house and means for, at will, distributing material from said conveyer above the storage space between the landward track and said house, substantially as described.

24. The improvements herein described, comprising a storage dock, in combination with an elevated bridge movable longitudinally thereof, a storage house having an opening in its roof, in position to be continuously served by said bridge and means closing said opening against the weather, substantially as described.

25. The improvements herein described, comprising a storage dock having widely separated bridge carrying tracks parallel with its front, in combination with a bridge movable on said tracks, a storage house parallel with said tracks, a conveyer for said bridge, said house having a longitudinal opening in its roof positioned to be continuously served by said conveyer and a secondary roof above said opening, substantially as described.

26. In a storage house for bulk material, such as coal, a low building having its roof disposed at substantially the angle of the flow of the material stored and provided with a slot or opening at its ridge, in combination with a longitudinally operative distributer or conveyer, arranged beneath said slot or opening, an elevated conveyer supported adjacent to said building and movable longitudinally thereof, means for loading said conveyer and the end of said conveyer being disposed above said slot or opening to deliver material thereto, substantially as described.

27. In a storage house for bulk material, such as coal, a building having its roof parts disposed at substantially the angles of the flow of the material stored and provided with a slot at the ridge, said slot being substantially as long as the building, in combination with a conveyer disposed in said slot or opening and adapted to distribute material longitudinally in the building and means operable parallel with said conveyer for delivering material to different points along said conveyer, substantially as described.

28. In a storage house for bulk material, such as coal, a building having a slot or opening at the ridge of its roof and substantially as long, in combination with a longitudinally operative conveyer arranged in said slot to deliver material to progressive points in said house and a traveling bridge movable at the side of the house and above the same for conveying material to said conveyer substantially as described.

29. In a storage house for bulk material, such as coal, a building having its roof parts disposed at substantially the angles of the flow of the material stored and provided with a slot at the ridge, said slot being substantially as long as the building, in combination with a conveyer disposed in said slot or opening and adapted to distribute material longitudinally in the building, means above the building for depositing material to be stored upon said conveyer and a roof extension above said slot and open at one side to permit free movement of said means, substantially as described.

30. The improvements herein described, comprising a storage house having peaked roof and provided with a longitudinal opening or openings at its peak in combination with a longitudinally operative conveyer for removing material from said opening, a roof extension above said opening and open at the side, a traveling elevated structure movable from end to end of the building, a conveyer thereon projecting beneath said roof extension and mechanism for removing material from said house, substantially as described.

31. The improvements herein described, comprising a storage dock, a traveling elevated structure movable longitudinally thereof, a trolley and grab bucket operable on said structure for distributing material transversely of the dock, a storage building at the landward end of said structure and having a longitudinal conveyer in its top to be served thereby, a conveyer on said structure for transferring material thereto independently of the trolley, a car track paralleling the path of said structure, a hopper on said structure to be served by said trolley and car and conveyer loading spouts leading from said hopper, substantially as described.

32. The improvements herein described, comprising a storage dock having space for stockpiles, in combination with bridge carrying tracks arranged at opposite sides of said space, a storage house having receiving and distributing means at the top and arranged at the landward side of said tracks, a traveling bridge spanning said space, having its landward end above said house, car tracks paralleling said bridge tracks, hoppers carried by said bridge for loading cars on said car tracks, unloading means at the dock front end of said bridge to deposit material in one said hopper and a conveyer on said bridge for carrying material from the last named hopper to the receiving means at the top of said house, substantially as described.

33. The improvements herein described, comprising a storage dock, having parallel stock pile spaces, in combination with tracks arranged at the dock front and between said spaces, an elevated bridge movable on said tracks, car tracks paralleling the bridge tracks, hoppers carried by said bridge, screening apparatus at one of said hoppers, a conveyer leading from the other hopper to the landward end of the bridge, said hoppers being adapted to the loading of cars on said track, a trolley on said bridge and a grab bucket operated thereby for conveying material to said hoppers and spaces, substantially as described.

34. The improvements herein described, comprising a storage dock, having parallel stock pile spaces, in combination with tracks arranged at the dock front and between said spaces, an elevated bridge movable on said tracks, car tracks paralleling the bridge tracks, hoppers carried by said bridge, screening apparatus at the landward hopper, a conveyer leading from the other hopper to the landward end of the bridge, means for discharging material from said conveyer at a point between its ends, said hoppers being adapted to the loading of cars on said track, a trolley on said bridge and a grab bucket operated thereby for conveying material to said hoppers and spaces, substantially as described.

35. The improvements herein described, comprising a storage dock having parallel stock pile spaces, in combination with tracks arranged at the dock front and between said spaces a storage house at the landward side of said spaces and having a receiving opening in its roof, a distributer operating longitudinally in said house, a traveling bridge constructed to travel on said tracks and extending from the dock front to the opening in the roof of said house, an unloader boom or movable extension at the dock front end of said bridge, a grab bucket and operating trolley movable on said bridge and boom, a hopper carried by the dock front end of said bridge to receive material from said bucket, a conveyer carried by the bridge and arranged to convey material from said hopper to the opening in the roof of said house, a hopper carried by the landward end of said bridge, screening apparatus in connection therewith, a conveyer leading therefrom to the space adjacent to said house and means for discharging material into said space from the first mentioned conveyer, substantially as described.

36. The improvements herein described, comprising a storage dock having widely separated bridge-carrying tracks dividing the dock into stock pile spaces, a storage house at the landward side of said spaces and having a receiving opening in its roof, a distributer operating longitudinally in said house, a bridge constructed to travel on said tracks and extending from the dock front to the opening in the roof of said house, said bridge being adapted to assume various angular positions across said spaces, an unloader boom or movable extension at the dock front end of said bridge, a grab bucket and operating trolley movable on said bridge and boom, a hopper carried by the dock front end of said bridge to receive material from said bucket and a conveyer carried by the bridge and having its discharge end constantly above the opening in the roof of said house, substantially as described.

37. The improvements herein described, comprising a bridge proper, in combination with supporting cars for said bridge, one of said cars permitting the bridge to swing in a horizontal plane, compensating means interposed between the other car and the bridge, a trolley track on the top of said bridge, a trolley thereon and a grab bucket hanging from said trolley on a side of the bridge and a telescoping unloader boom for said bridge having a track upon which trolley runs, substantially as described.

38. The improvements herein described comprising a bridge proper, in combination with a trolley and bucket to operate upon the top of said bridge, supporting cars and tracks therefor, a tower upon each said car, a turn table interposed between each car and the bridge, one of said towers being rigidly joined to the bridge and the other being pivotally connected thereto, a hopper on each tower and a conveyer leading from each hopper, substantially as described.

39. The improvements herein described, comprising a bridge proper, in combination with a trolley and bucket to operate upon the top of said bridge, supporting cars and tracks therefor, a tower upon each said car, a turn table interposed between each car and the bridge, one of said towers being rigidly joined to the bridge and the other being pivotally connected thereto, a hopper on and projecting from the side of each tower and a conveyer leading from each hopper, substantially as described.

40. The improvements herein described, comprising tracks and cars, in combination with an elevated structure carried by said cars and comprising a horizontal portion or bridge proper, a rigid tower adapted for rotation upon a vertical axis on one of said cars, a compensating tower pivotally connecting the other car and said bridge, a turn table being interposed between each car and said bridge, a hopper arranged upon each tower and projecting from both sides thereof, a trolley running upon the top of said bridge and buckets to serve said hoppers from opposite sides of the bridge, as and for the purpose described.

41. The improvements herein described, comprising a pair of supporting cars, in combination with a bridge proper, a rigid tower connecting the bridge and one of the cars, said tower being adapted to turn upon its vertical axis, a link-like compensating tower arranged between the other car and said bridge, the latter tower being hinged or pivoted upon its car and swiveled to said bridge, an unloader boom telescopically joined to the end of said bridge, a trolley arranged to run upon the top of said bridge and boom and a bucket or buckets suspended therefrom, substantially as described.

42. The improvements herein described, comprising a bridge proper which is composed of a pair of upper chords bearing rails and a pair of lower chords rigidly joined throughout by a plurality of vertical, horizontal and diagonal members, in combination with supporting towers for said bridge, cars whereon the towers are mounted, a trolley adapted to run upon the rails on the top of the bridge, and a grab bucket or the like suspended therefrom at the side of the bridge and a pivoted boom having rails that aline with the rails on the bridge, substantially as described.

43. The improvements herein described, comprising tracks, cars or trucks on said tracks, a bridge carried by said cars and adapted for angular movement upon and with the cars, said bridge being composed of a pair of side frames or trusses, a trolley adapted to operate upon the top chords of said bridge, and a grab bucket or the like suspended from the trolley at the side of the bridge and a pivoted unloader boom having top members alined with said top chords to receive said trolley, substantially as described.

44. The improvements herein described, comprising bridge supporting cars, towers rising therefrom, a bridge supported by said towers, a hopper positioned in the lower portion of each of said towers and projecting from opposite sides thereof below said bridge, a trolley operable on the top of said bridge and having sheaves overhanging the sides of the bridge and towers and hence positioned above the projecting ends of said hoppers and grab buckets hanging from said sheaves on opposite sides of the bridge for delivering material to said hopper, substantially as described.

45. The improvements herein described, comprising bridge supporting cars, in combination with towers rising therefrom, a bridge supported by said towers, a hopper arranged in the lower end of each of said towers and projecting from opposite sides thereof, a trolley operable on the top of said bridge and having sheaves overhanging the sides of the bridge and towers and hence positioned above the projecting ends of said hoppers, grab buckets hanging from said sheaves on opposite sides of the bridge and a conveyer rising upward from one of said hoppers and extending within said bridge to the opposite end of the bridge, substantially as described.

46. The improvements herein described, comprising bridge supporting cars, in combination with towers rising therefrom, a bridge supported by said towers, trolley rails upon the top of the bridge, a trolley to run thereon and overhanging the sides of the bridge, grab buckets suspended from the trolley at opposite sides of the bridge, an unloader boom telescopically pivoted upon the end of the bridge and having rails for said trolley, the supports of said boom being below said rails and inside of the path of said buckets, substantially as described.

47. The improvements herein described, comprising bridge supporting cars, in combination with towers rising therefrom, a bridge supported by said towers, a grab bucket, its trolley, arranged to run upon the top chords of said bridge and support said bucket at the side of the bridge, a hopper upon one of said towers to receive material from said bucket and a conveyer rising from said hopper to a point within the bridge, below the top thereof and extending thence to the opposite end of the bridge, substantially as described.

48. The improvements herein described, comprising bridge supporting cars, in combination with towers rising therefrom, a bridge supported by said towers, a grab bucket, its trolley, arranged to run upon the top chords of said bridge and support said bucket at the side of the bridge, a hopper upon one of said towers to receive material from said bucket, a conveyer rising from said hopper to a point within the bridge, below the top thereof and extending thence to the opposite end of the bridge and means within the bridge for discharging material at an intermediate point on said conveyer, substantially as described.

49. The improvements herein described, comprising bridge supporting cars, in combination with a bridge supported thereby, an unloader boom arranged on the end of said bridge and adapted to telescope with said bridge, trolley rails arranged upon the top chords of the bridge and the boom, a trolley overhanging the side of the bridge and boom and a grab bucket hanging from the trolley adjacent to said side, substantially as described.

50. The improvements herein described, comprising bridge supporting cars, in combination with a bridge supported thereby, an unloader boom, movably arranged on and telescoping with the end of said bridge, trolley rails arranged upon the top chords of the bridge and the boom, a trolley overhanging the side of the bridge and boom and a grab bucket hanging from the trolley adjacent to said side and movable along said side above the bottom chord of the bridge, substantially as described.

51. The improvements herein described, comprising bridge supporting cars, in combination with a bridge supported thereby, an unloader boom, extensibly mounted on the end of said bridge, trolley rails upon the top of said bridge and boom, a trolley adapted to run thereon, said trolley overhanging the sides of said bridge and boom and two grab buckets hanging from said trolley on opposite sides of the bridge and spaced to correspond with the boat hatches, substantially as described.

52. The improvements herein described, comprising a movable, elevated structure having trolley rails upon its top, in combination with an unloader boom movably mounted on said structure to form an extension thereof, trolley rails on said boom forming extensions of the rails of the structure, a trolley to run on said rails and a bucket hanging from said trolley beyond the side of the bridge and boom, substantially as described.

53. The improvements herein described, comprising a movable, elevated structure having trolley rails upon its top, in combination with an unloader boom movably mounted on said structure to form an extension thereof, trolley rails on said boom forming extensions of the rails of the structure, a trolley to run on said rails and two buckets hanging from said trolley on opposite sides of said structure and boom, substantially as described.

54. A movable elevated structure, in combination with a movable member or boom mounted on said structure and wholly supported within the same, rails provided on the top of said structure and boom, a trolley to run on said rails, cabs depending from said trolley on opposite sides of the structure and boom and grab buckets hanging from said trolley, substantially as described.

55. The improvements herein described, comprising a movable elevated structure, in combination with an extensible unloader boom thereon, means within said structure and below the top thereof for operating said boom and a trolley arranged to run upon the top of said structure and boom, substantially as described.

56. The improvements herein described, comprising a movable elevated structure, in combination with an extensible unloader boom thereon, means within said structure and below the top thereof for operating said boom, a trolley arranged to run upon the top of said structure and boom and cabs and buckets hanging from said trolley on opposite sides of said structure, substantially as described.

57. The improvements herein described, comprising an elevated structure, in combination with a bascule-like unloader boom mounted on said structure with its top normally in the plane of the top thereof, alined rails on the top of said structure and said boom, a trolley to run on said rails, a grab bucket hanging from said trolley beyond the side of said structure and boom and means within the structure for raising said boom, substantially as described.

58. The improvements herein described, comprising a dock, an elevated structure, movable along the dock, a boom pivoted intermediate its ends upon and projecting from said structure and normally overhanging the dock, abutments for the inner end of said boom within said structure, trolley rails upon the top of said structure and boom, a trolley to run thereon and a grab bucket depending from said trolley, substantially as described.

59. The improvements herein described, comprising a dock, an elevated structure, movable along the dock, a boom pivoted intermediate its ends upon and projecting from said structure and normally overhanging the dock, abutments for the inner end of said boom within said structure, trolley rails upon the top of said structure and boom, a trolley to run thereon and grab buckets hanging from said trolley on opposite sides of said structure and boom, substantially as described.

60. The improvements herein described, comprising an elevated traveling bridge, in combination with a boom pivoted intermediate its ends on the end of said bridge, the inner end of said boom, when in working position abutting an end portion of the bridge, boom operating means upon the bridge below the top thereof and alined parallel rails upon the top of said bridge and boom, substantially as described.

61. The improvements herein described, comprising an elevated traveling bridge, in combination with a boom pivoted intermediate its ends on the end of said bridge, the inner end of said boom, when in working position abutting an end portion of the bridge, boom operating means upon the bridge below the top thereof, alined parallel rails upon the top of said bridge and boom, a trolley to run on said rails and grab buckets hanging from said trolley on opposite sides of said bridge, substantially as described.

62. The improvements herein described, comprising an elevated structure, in combination with a trolley track on the top thereof and of substantially the same width, a boom pivoted intermediate its ends on the end of said structure and at its inner end adapted to abut said structure, a trolley track on said boom and alined with the track on the structure and means between the sides of the structure for operating said boom, substantially as described.

63. The improvements herein described, comprising a movable elevated structure having parallel top chords, in combination with an unloader boom, pivoted intermediate its ends on the end of said structure and having parallel top chords alined with and adapted to abut the ends of the chords of said structure, means beneath said chords for pivotally operating said boom, a trolley adapted to run on said top chords and a bucket hanging from said trolley at the side of said boom and structure, substantially as described.

64. The improvements herein described, comprising a storage dock, in combination with a storage house disposed longitudinally thereon, a traveling bridge movable at the side of said house and having trolley rails upon its top, an extension upon the end of the bridge beyond the trolley rails, a trolley to run on said rails, a grab bucket hanging therefrom at the sides of the bridge, a hopper at the opposite end of the bridge and a conveyer extending from said hopper through the bridge and at its end supported above said house by said extension, substantially as described.

65. The improvements herein described, comprising a dock, widely separated tracks thereon, a traveling bridge movable on said tracks, a bascule unloader member on the end of the bridge, means on the bridge for actuating said member, a trolley adapted to run on the top of said bridge and member, a storage house landward of said tracks and parallel therewith, said house having an opening in its roof to receive material from said bridge, substantially as described.

66. The improvements herein described, comprising a raised structure having trolley rails on its top, in combination with a projectable unloader member, also having rails on its top, means whereby said member is supported and operated from within the structure below the top thereof, substantially as described.

67. The improvements herein described, comprising a raised structure having trolley rails on its top, in combination with a projectable unloader member, also having rails on its top, means whereby said member is supported and operated from within the structure below the top thereof, a hopper carried by said structure and projecting laterally therefrom, a trolley movable on said rails, a grab bucket carried by the trolley at the side of said structure and adapted to discharge material into said projecting hopper, substantially as described.

68. The improvements herein described, comprising a raised structure carrying a trolley track, a bascule unloader member pivoted on said structure and having track extensions, means below the top of said structure for operating said member and a trolley operable on said track, substantially as described.

69. The improvements herein described, comprising a dock, a structure movable thereon and having a boom overhanging the dock front, normally level rails on the tops of said boom and structure, a trolley movable thereon and two grab buckets depending from and operable by said trolley, the distance between said buckets corresponding to the distance between the hatches of the vessel, substantially as described.

In testimony whereof, I have hereunto set my hand, this 17th day of December, 1908, in the presence of two subscribing witnesses.

HERMAN P. ANDRESEN.

Witnesses:
   CHARLES GILBERT HAWLEY,
   JOHN R. LEFEVRE.